Jan. 9, 1968 SHIZUHIKO TANIGAWA 3,363,065

SINGLE GUIDE MEANS FOR HELICALLY WRAPPING TAPE AROUND A ROTATING RECORDING HEAD

Filed Dec. 24, 1963 2 Sheets-Sheet 1

INVENTOR
Shizuhiko Tanigawa
By Stevens, Davis, Miller & Mosher
ATTORNEYS

Jan. 9, 1968 SHIZUHIKO TANIGAWA 3,363,065

SINGLE GUIDE MEANS FOR HELICALLY WRAPPING TAPE AROUND A ROTATING RECORDING HEAD

Filed Dec. 24, 1963 2 Sheets-Sheet 2

INVENTOR
Shizuhiko Tanigawa
By Stevens, Davis, Miller & Mosher
ATTORNEYS

United States Patent Office 3,363,065
Patented Jan. 9, 1968

3,363,065

SINGLE GUIDE MEANS FOR HELICALLY WRAPPING TAPE AROUND A ROTATING RECORDING HEAD

Shizuhiko Tanigawa, Moriguchi-shi, Japan, assignor to Matsushita Electric Industrial Co., Ltd., Osaka, Japan, a corporation of Japan Filed Dec. 24, 1963, Ser. No. 333,142
Claims priority, application Japan, Dec. 27, 1962, 37/59,293; Dec. 28, 1962, 37/59,691; July 31, 1963 (utility model), 38/58,613
4 Claims. (Cl. 179—100.2)

ABSTRACT OF THE DISCLOSURE

A system for magnetically recording and reproducing a wide-band signal, including a magnetic tape, a tape guide member having a rotary head including a magnetic transducer adapted to successively sweep diagonally across said magnetic tape and an idler roller having an axis making a predetermined angle with the axis of said tape guide member and adapted both to guide said magnetic tape towards a starting portion of the sweep by said magnetic transducer on said magnetic tape and to guide said magnetic tape away from a terminating portion of the sweep of said magnetic transducer on said magnetic tape.

The present invention relates to means for recording and reproducing in a magnetic recording and reproducing system. More particularly, the invention relates to a magnetic recording and reproducing device adapted for recording and reproducing a wide-band signal by a rotary head including a magnetic transducer, wherein said magnetic tape is made to cross in a space between a tape guide member having said rotary head disposed therein and an idler roller disposed adjacent said guide member.

In conventional magnetic recording methods of directly recording on a magnetic tape a signal such as a television signal having an extremely high frequency or ranging over an extremely wire frequency band, it is generally necessary to provide an excessively high relative speed between a recording or reproducing head and a moving magnetic medium in order to record or reproduce high frequency components of such signal. On the other hand, the magnetic medium such as a magnetic tape is required to run at an ordinary low speed. As a compromise to satisfy both of these requirements, the required relative speed between the tape and the recording head is attained by mechanically rotating the magnetic head at a high speed in the transverse direction of the tape. The tape is made to run past said head in the longitudinal direction of the tape at a rate of 15 inches per second, and the signal is recorded in the form of a series of transverse lines or tracks. According to this method, a rotary disc having the rotary head mounted thereon is rotated at 14,400 r.p.m., and a tape guide member is disposed about said rotary disc so that it covers the peripheral face of said disc through an angle of the order of 100° for abutment with said tape of a width of 2 inches. As an improvement in the above method, there is proposed a method in which a rotary head is made to sweep a magnetic tape in slanting relation thereto. In this method, the tape makes a turn about a stationary cylinder and the rotary recording head is disposed in the cylindrical tape guide member. Therefore, the tape is made to run in the diagonal direction with respect to said cylindrical tape guide member, and diagonal tracks of record are thereby formed. According to this method, however, lack of magnetized tracks on the tape by a recording signal appears at both edges of the tape due to the sweep by the single magnetic head, and this will result in the deficiency of a reproduced signal in the case of reproducing.

When the device described above is utilized to record and reproduce a television signal, general procedure is such that said non-recorded portion is made to coincide with a vertical blanking period of the television signal to be recorded. However, such non-recorded portion is not fixed but varies from time to time, and therefore the reproduced signal is subject to variation, which results in instability of reproduced pictures.

With the defects in prior technique in view, the primary object of the invention is to provide improved means for recording and reproducing in a device for recording and reproducing a wide-band signal comprising a magnetic tape and a rotary head including a magnetic transducer.

Another object of the invention is to provide a magnetic recording and reproducing device of said character wherein said magnetic transducer is adapted to successively sweep diagonally across the magnetic tape, said device comprising a tape guide member having said rotary head disposed therein, and an idler roller having an axis making a predetermined angle with the axis of said tape guide member and adapted to guide said magnetic tape towards a starting portion of the sweep by said magnetic transducer on said magnetic tape and guide said magnetic tape away from a terminating portion of said sweep, said magnetic tape being made to cross in a space between said idler roller and said tape guide member.

Still another object of the invention is to provide a magnetic recording and reproducing device of said character, comprising a capstan in place of said idler roller, at least one pinch roller disposed in abutting relation with said capstan with the magnetic tape interposed therebetween, and means for driving the magnetic tape by said capstan and said pinch roller.

Yet another object of the invention is to provide a magnetic recording and reproducing device of said character, comprising a first idler roller having an axis making a predetermined angle with the axis of said tape guide member and adapted to guide the magnetic tape towards a starting portion of the sweep by said magnetic transducer on said magnetic tape, and a second idler roller having an axis making a predetermined angle with the axis of said tape guide member and adapted to guide the magnetic tape away from a terminating portion of the sweep by said magnetic transducer on said magnetic tape, said magnetic tape being made to cross in a space between said two idler rollers and said tape guide member.

Further another object of the invention is to provide a magnetic recording and reproducing device of said character comprising two idler rollers, and a tape guide groove provided on the side face of said tape guide member in eccentric relation thereto, said two idler rollers being disposed adjacent a portion where the face of said tape guide groove merges with the side face of said tape guide member.

Another object of the invention is to provide a magnetic recording and reproducing device of said character comprising a capstan, and at least one pinch roller, said capstan and said pinch roller being disposed adjacent a portion where the side face of said tape guide member merges with the face of said tape guide groove provided on the side face of said tape guide member in eccentric relation thereto.

There are other objects and particularities of the invention which will become obvious from the following description with reference to the accompanying drawings, in which:

FIGS. 1–8 show a magnetic recording and reproducing device of the invention adapted for recording and reproducing a wide-band signal by a rotary head including a magnetic transducer, wherein a magnetic tape is made to cross in its passage between a tape guide member having said rotary head disposed therein and an idle roller disposed adjacent said tape guide member.

Although explanation has been given more or less in detail with regard to conventional devices, further detailed explanation thereof will assist in better understanding of the contents of the device according to the invention which will be explained in more detail in a later description. There are several of such conventional devices, but explanation will be made hereinunder with reference to a typical one among them. According to the cited device, a magnetic tape makes spirally a turn about an outer peripheral face of a stationary cylinder and a rotary head is arranged to successively sweep diagonally across said tape. This device is disclosed fairly in detail on pages 27–29 of a German magazine "Electronische Rundschau," January number, 1963, and on pages 823–825 of a Japanese magazine "Toshiba Review," March number, 1961. Hereinunder, an outline of the method of recording and reproducing by the device will be described although it may be too brief.

Figure 9:
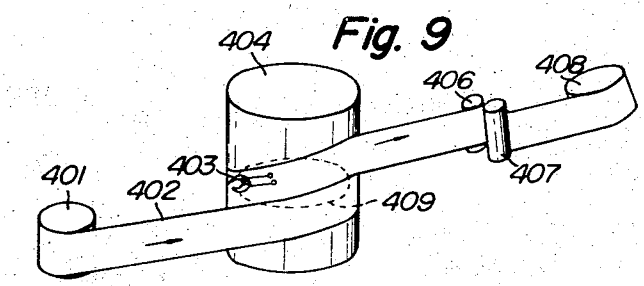
FIG. 9 is an explanatory perspective view of one form of a conventional magnetic recording and reproducing device comprising a rotary head including a magnetic transducer.
Figures 10, 11, 12:
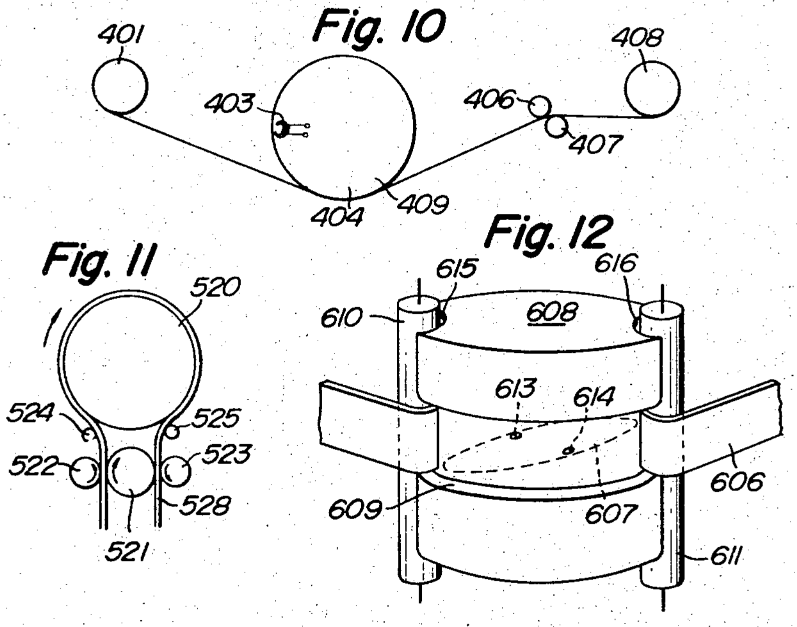
FIG. 10 is a plan view of the device of FIG. 9.
FIG. 11 is a plan view of a rotary head mechanism of another conventional magnetic recording and reproducing device comprising a rotary head including a magnetic transducer.
FIG. 12 is a perspective view of a rotary head mechanism of still another conventional magnetic recording and reproducing device comprising two rotary heads including magnetic transducers.

The cited device has a structure as shown in FIGS. 9 and 10, and will be explained with reference to the drawings. The device is mainly composed of a cylindrical member 404 split into two sections of upper and lower members coaxially disposed, a disc 409 adapted for rotation in a narrow gap between the upper and lower members, a head 403 including a transducer mounted on the disc, and a head driving motor (not shown) disposed in the lower cylindrical member.

A magnetic tape 402 is supplied from a supply reel 401, spirally makes a turn about the cylindrical member 404 along its outer peripheral face, further fed between a capstan 406 and a pinch roller 407, and taken up on a take-up reel 408. A multiplicity of pin-like guides are embedded in the face of the cylindrical member 404 so that the vertical position of the tape can thereby be determined.

The rotary head is rotated by the electric motor at 3,600 r.p.m. in abutting relation with the tape. When, however, the tape is made to run on the cylindrical member in such spiral manner, the tape makes a vertical motion, though only slightly, on the cylindrical tape guide member due to variation in the travelling speed of the tape or change in friction between the cylindrical member and the tape. It is therefore a matter of difficulty for the tape to continually travel while maintaining the same position. Thus, it is difficult to maintain the constancy of a non-recorded range developed during the change-over of recorded tracks, and this will result in inconstancy of the non-recorded period or a transient time before and after the non-recorded period. When, therefore, recording and reproducing is made under such a condition, the magnetic head can not accurately trace the same tracks recorded on the tape. The conventional device has been defective in that, when the break coincides with a period of a vertical synchronizing signal in a vertical blanking period of a television signal, no vertical synchronizing signal or, at most, incomplete vertical synchronizing signal appears in the reproduced signal, resulting in instability of reproduced pictures. Further, in case of quick normal and reverse feed, there has been a possibility that the tape sags or wrinkles are formed on the tape due to the vertical movement of the tape, and the tape has been cut off in a worst case.

In order to eliminate the instability as described above, a method as shown in FIG. 11 has been devised in which a tape is guided in an omega-shaped path. According to this method, a tape 528 is made to pass between a capstan 521 and a pinch roller 522 and fed past a tape guide post 524 to turn approximately round a tape guide member 520 in which a rotary head is disposed. The tape 528 is then guided away from the tape guide member 520 past another post 525 and fed between the capstan 521 and another pinch roller 523 to be taken up. In this arrangement, the tape 528 is driven by the capstan 521 to run in the direction of arrow. According to this method, constancy of a non-abutting portion between the tape 528 and the tape guide member 520 is maintained by the two posts 524 and 525. In order to deal with a non-recorded portion caused by the non-abutting portion, there has been provided means for solely recording a periodic information having a low frequency component in the form of a separate track of record or means for inserting during reproducing a new periodic information by the use of a signal generator of separate installation. Thus, this method requires an extremely complicated and expensive device.

There has also been proposed a method in which two rotary heads are used in lieu of one rotary head is described above. According to this method, a tape 606 is supplied past an idler roller 610 and turns half round a tape guide member 608 in which a rotary disc 607 having two magnetic heads 613 and 614 is disposed. The tape 606 is then fed past another idler roller 611 and a capstan mechanism (not shown) and taken up. According to this method, it is necessary to provide two sets of recording and reproducing amplifiers and means for changing over output of the two heads during reproducing, since there are provided two magnetic heads 613 and 614. Further, the tape 606 runs in a tape guide groove 609 of a uniform depth provided in the cylindrical tape guide member 608. However, in order to make the tape 606 to closely abut the peripheral face of the tape guide member 608 along a portion slightly greater than an arc of 180° to thereby obtain a continuously reproduced signal, the two idler rollers 610 and 611 must be disposed at positions closely adjacent the tape guide member 608. Therefore, it is necessary to provide two recesses 615 and 616 in the guide member 608 at positions opposite the idler rollers 610 and 611, respectively. It is impossible, therefore, to provide a suitable clearance between the two idler rollers 610 and 611 and the tape guide member 608, and tip portions of the magnetic heads 613 and 614 are liable to abut the idler rollers 610 and 611, resulting in breakage of these heads. It has been difficult to adjust the positions of the magnetic heads 613 and 614 relative to the positions of the idler rollers 610 and 611.

The present invention provides a magnetic recording and reproducing device having a rotary head which is free from the defects encountered by the prior devices. One form of the invention will now be explained with reference to FIGS. 1–3.

Figure 1:
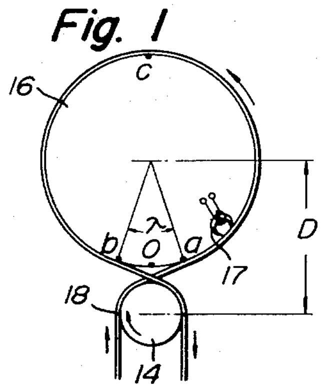
FIG. 1 is a plan view of one form of a rotary head mechanism of a magnetic recording and reproducing device according to the invention adapted for recording and reproducing a wide-band signal.
Figure 2:
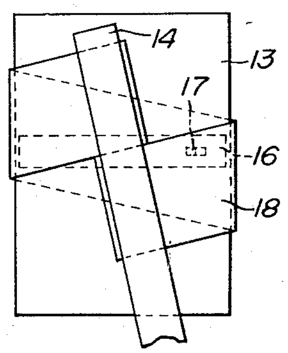
FIG. 2 is a side view of the rotary head mechanism of FIG. 1.

A magnetic head 17 provided on a rotary disc 16 is adapted to successively sweep diagonally across a magnetic tape 18 which runs in the direction of arrow in FIG. 1 at a constant speed on the surface of a cylindrical tape guide member 13. The magnetic tape 18 is guided past the left-hand side, as viewed in FIG. 1, of a lower portion of an idler roller 14 towards a starting portion *a* of the sweep by the magnetic head 17 on the tape guide member 13, and then made to run along the side face of said guide member 13. The magnetic tape 18 is guided away from the guide member 13 at a terminating portion *b* of the sweep and made to pass crosswise in a three-dimensional manner over that portion of the tape 18 which has been guided towards the tape guide member 13. Then, the tape 18 is guided past the right-hand side of an upper portion of the idler roller 14 away from the rotary head mechanism, and taken up through a capstan mechanism (not shown). The idler roller 14 is mounted on a base plate in a manner that it makes a predetermined angle with the axis of the tape guide member 13 and is spaced from the guide member 13 a fixed center distance D. As described above, the idler roller 14 serves to guide the magnetic tape 18 towards the starting portion *a* of the sweep by the magnetic head 17 on the tape guide member 13 and guide the magnetic tape 18 away from the terminating portion *b* of the sweep. Therefore, a period during which the magnetic tape 18 abuts a range $\overset{\frown}{aob}$ of the tape guide member 13 is shorter than a period during which the tape abuts the guide member by making a turn thereabout along its entire periphery as in a conventional case. Therefore, a non-abutting range of an arc $\overset{\frown}{aob}$ is left which is an arc corresponding to a center angle $\lambda$ of the tape guide member 13. Further, the magnetic tape 18 runs along two crossed tangent lines between the tape guide member 13 and the idler roller 14. Tracks 19 thus recorded on the magnetic tape 18 make an angle $\theta$ with edges of the tape, and non-recorded portions 20 and 21 are left on the respective edges of the tape 18. These non-recorded portions 20 and 21 are utilized for recording an audio signal, a synchronizing signal, or the like when a video signal in a television signal, for example, is recorded on the tracks 19.

The length of the non-recorded range $\overset{\frown}{aob}$ can be suitably adjusted by varying the center distance D between the tape guide member 13 and the idler roller 14. Ordinarily, the space between the center O of the non-abutting range of the tape guide member 13 and the periphery of the idler roller 14 is made as narrow as possible, that is, the non-recorded period is made as short as possible so long as the magnetic tape 18 can travel crosswise in a three-dimensional manner and the tip of the magnetic head 17 may not abut the idler roller 14.

Figures 3, 4, 5, 6:
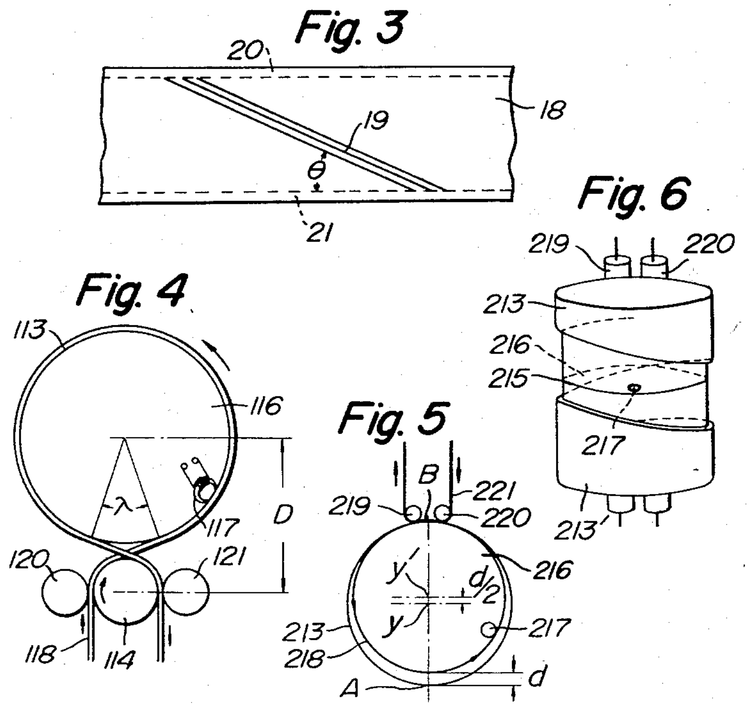
FIG. 3 is a plan view of a portion of a magnetic tape on which tracks are shown as recorded by the device of the invention.
FIG. 4 is a plan view of another form of the rotary head mechanism of the magnetic recording and reproducing device according to the invention.
FIG. 5 is a plan view of still another form of the rotary head mechanism of the magnetic recording and reproducing device of the invention.
FIG. 6 is a front view of the rotary head mechanism of FIG. 5.

FIG. 4 shows another form of the invention. In FIG. 4, a capstan 114 is employed in lieu of the idler roller 14 of FIG. 1. The capstan 114 serves a dual purpose of guiding and driving a magnetic tape 118. A magnetic head 117 having a thickness of 300 $\mu$m. and a gap of 2.5 $\mu$m. is provided on a rotary disc 116 having a diameter of 95.4 mm. A tape guide member 113 of cylindrical shape is disposed on a base plate in a manner that it has an inclination of 10°8′ with respect to the normal to the base plate and has a diameter of 95.4 mm. The magnetic head 117 is adapted to successively sweep diagonally across the magnetic tape 118 having a width of 2 inches which is made to run on the surface of the tape guide member 113 in the direction of arrow at a rate of 16.7 cm./second. The magnetic tape 118, as in the case of FIG. 1, is made to cross in a three-dimensional manner in a space of 0.1 mm. between the capstan 114 and the tape guide member 113. A non-recorded range for a signal, in this case, makes an angle $\lambda$ of 11°40′ on the tape guide member 113. The capstan 114 has a diameter of 10 mm. and a length of 121 mm., and is vertically disposed on the base plate at a position spaced from the tape guide member 113 a center distance D of 52.8 mm. The capstan 114 is rotated at 334 r.p.m. by a motor (not shown) through a belt. Therefore, said inclination of 10°8′ is maintained between the capstan 114 and the tape guide member 113. On the respective sides of the capstan 114, there are disposed two pinch rollers 120 and 121, which have a diameter of 35 mm. and a length of 57 mm. and are brought into pressure contact with the capstan 114 with the magnetic tape 118 interposed therebetween, so that the pinch rollers 120 and 121 rotate with the capstan 114 to thereby drive the magnetic tape 118.

This arrangement provides a simple structure since the two pinch rollers 120 and 121 are disposed opposite to each other so as to abut both sides of the capstan 114 and the capstan 114 also acts as the idler roller 14 of FIG. 1, as described above. Further, the non-recorded portion on the tape can be arbitrarily adjusted by varying the center distance D between the capstan 114 and the tape guide member 113. Moreover, by varying the inclination of the capstan 114 relative to the tape guide member 113, the tape 118 can be made to closely and smoothly abut the tape guide member 113. This adjustment can simply be made even after the device has been completely assembled.

Figure 7:
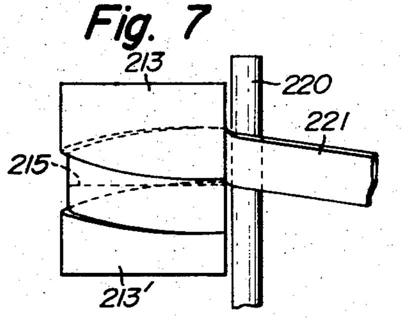
FIG. 7 is a side view of the rotary head mechanism of FIG. 5.

Still another form of the invention is shown in FIGS. 5–7. In this embodiment, two idler rollers 219 and 220 are employed in lieu of the single idler roller 14 in FIG. 1. A magnetic tape 221 is made to run at a constant speed on the side face of a cylindrical tape guide member 213 wherein a rotary head 216 having a magnetic head 217 is disposed. The cylindrical tape guide member 213 is actually split into two sections 213 and 213′ which are disposed in coaxial relation with a slight gap 215 provided therebetween and fixed on a base plate. The tip of the magnetic head 217 disposed on the rotary disc 216 can protrude through the gap 215, and a tape guide groove 218 having a width equal to that of the tape is spirally formed on the side face of the tape guide members 213 and 213′. As shown in FIG. 5, the face of the tape guide groove 218 merges with the side face of the tape guide members 213 and 213′ at a point B where the groove 218 opposes the two idler rollers 219 and 220 disposed adjacent the tape guide member 213. The tape guide groove 218 is made successively deeper as it goes away from the point B, and has a greatest depth *d* at a point A opposite the point B. That is, the center Y′ of the tape guide groove 218 is disposed from the center Y of the tape guide member 213 by a distance $d/2$.

A magnetic tape 221 is fed out of a supply reel (not shown) and guided past the idler roller 220 towards a starting portion of the sweep by the magnetic head 217 on the tape guide member 213, then made to run along the tape guide groove 218 formed on the side face of the guide member 213. The tape 221 is then disengaged from the tape guide groove 218 at a terminating portion of the sweep, made to cross in a three-dimensional manner with the portion of the tape 221 which has been guided towards the tape guide member 213 through the idler roller 220, and guided away from the rotary head mechanism through another idler roller 219, then taken up through a capstan mechanism (not shown). The two idler rollers 219 and 220 are disposed on the base plate in a manner that each makes a predetermined angle with respect to the axis of the tape guide member 213 and spaced from the tape guide member 213 a fixed center distance. It will be known that, since the magnetic tape 221 is made to cross in the space between the two idler rollers 219 and 220 and the tape guide member 213, a non-recorded portion of a constant period is formed on the tape 221.

The mechanism shown in FIGS. 5–7 will be described hereinunder on a more materialized basis. The rotary disc 216 has a diameter of 110 mm. and is provided with the single magnetic head 217 having a thickness of 300 μm. and a gap of 2.5 μm. The magnetic tape 221 having a width of 1 inch is made to run on the side face of the tape guide member 213 at a rate of 30.48 cm./second. The two cylindrical tape guide members 213 and 213' have a diameter of 110 mm. and are vertically fixed on the base plate. The width of the gap 215 through which the tip of the magnetic head 217 protrudes is kept at 1 mm. The tape guide groove 218 formed on the side face of the tape guide members 213 and 213' has a width of about 1 inch which is equal to the width of the tape. The center Y' of the tape guide groove 218 is displaced from the center Y of the tape guide member 213 by a distance of 1 mm. so that the depth of the groove at the point A is 2 mm.

Each of the two idler rollers 219 and 220 has a diameter of 4 mm. and disposed on the base plate in a manner that it has an inclination of 3°27' with respect to the axis of the tape guide members 213 and spaced therefrom a center distance of about 57.2 mm. The idler rollers 219 and 220 are spaced from each other a center distance of 4.8 mm. The magnetic tape 221 is made to cross in a three-dimensional manner during its passage through the space of 0.16 mm. between the two idler rollers 219 and 220 and the tape guide member 213. The non-recorded period for signal thereby caused makes an angle of 12°21' on the tape guide member 213.

According to this embodiment, the tape guide groove is formed in eccentric relation to the tape guide member in a manner that the face of the guide groove merges with the side face of the cylindrical tape guide member at the specific portion, and the two idler rollers are disposed adjacent the merging face. Therefore, this arrangement permits to dispose these idler rollers adjacent the tape guide member without any provision of recesses in the tape guide member at portions opposite said idler rollers, and thus the space between the idler rollers and the magnetic head can be visually known. Therefore, the assembling and adjustment of the rotary head mechanism can be simplified.

Figure 8:
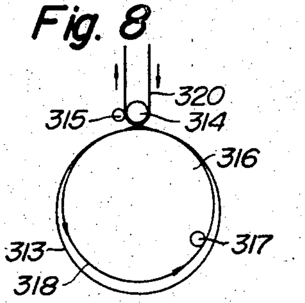
FIG. 8 is a plan view of yet another form of the rotary head mechanism of the device according to the invention.

Yet another form of the invention is shown in FIG. 8. In this embodiment, a capstan 314 and a pinch roller 315 are employed in lieu of the two idler rollers 219 and 220 in the embodiment shown in FIG. 5. A magnetic tape 320 is made to run at a constant speed on the side face of a tape guide member 313 wherein a rotary disc 316 having a single magnetic head 317 is disposed. The tape guide member 313 is provided with a tape guide groove 318, as in the case of FIG. 5, which is formed on the side face of the tape guide member 313 in eccentric relation thereto. The capstan 314 has a predetermined inclination with respect to the axis of said tape guide member 313 and is disposed adjacent a portion where the side face of the tape guide member 313 merges with the face of the tape guide groove 318. The capstan 314 is driven through a belt by a motor (not shown). On one side of said capstan 314, the pinch roller 315 is disposed to make pressure contact with the capstan 314 with the magnetic tape 320 interposed therebetween, so that the pinch roller 315 rotates with the capstan 314 to drive the magnetic tape 320 in the direction of arrow. As in the case of FIG. 4, the magnetic tape 320 is made to cross in a three-dimensional manner in the space between the capstan 314 and the tape guide member 313. By the intersection of the tape 320, a non-recorded period is formed on the magnetic tape 320.

In the following description, explanation will be given with regard to a case wherein above-described embodiments of the invention are utilized for recording and reproducing a television signal.

According to a method of recording and reproducing a television signal by the device of the invention, ordinarily the non-recorded period thus brought forth is made to coincide with a vertical blanking period of the television signal to be recorded. Or more precisely, the motor for driving the rotary head is rotated at 3,600 r.p.m. in synchronism with the vertical synchronizing signal of the television signal to be recorded, so that one track recorded on the magnetic tape corresponds with one field. In this case, by arranging in a manner that the portion that can not be reproduced by the presence of said non-recorded period is made to coincide with the vertical blanking period as described above, and by maintaining said non-recorded period as short and constant as possible by the means of the invention, it is possible to reproduce the vertical synchronizing signal in the vertical blanking period almost free from loss, in contrast to the conventional case where in such vertical synchronizing signal is completely lost or imperfectly reproduced. The vertical synchronizing signal is usually positioned in the first half of the vertical blanking period. Therefore, such complete reproduction of the vertical synchronizing signal can be attained by the utilization of the rotary head mechanism of the invention which is effective to position said non-recorded portion in the latter half of the vertical blanking period and yet effective to minimize its variation to thereby keep it within a definite range.

According to the invention, the angle occupied by the non-recorded period on the tape guide member is of the order of 12° as described above, and this corresponds to about nine horizontal scanning lines. It is known that, even when a reproduced signal lacking the horizontal synchronizing signal for a period of such extent is admitted in a television receiver, no derangement in the horizontal synchronization appears on the television picture by virtue of an automatic frequency control circuit incorporated in a horizontal oscillator in the receiver. Since, further, that portion of the blanking period which lies after the period of the vertical synchronizing signal in said vertical blanking period is far longer than the time corresponding to nine horizontal scanning lines, the non-recorded period will not appear on the television picture and no trouble will thereby be brought forth.

Although, in the foregoing description, the invention has been explained with reference to the specific embodiments thereof, it will be understood that the invention is in no way limited to such embodiments and various modifications and changes may be made without departing from the spirit of the invention.

What is claimed is:

1. A device for magnetically recording and reproducing a wide-band signal comprising a magnetic tape, a tape guide member, a rotary head disposed within said tape guide member and including a magnetic transducer adapted to successively sweep diagonally across said tape, an elongated idler roller disposed at a predetermined distance from said guide member, the longitudinal axis of said idler roller extending at an angle with respect to the longitudinal axis of said tape guide member, said idler roller having a length at least as great as twice the width of said tape, said tape extending from one side surface of one portion of said idler roller to the opposite side surface of said guide member so that the portion of said tape extending between said surfaces becomes a common inscribed tangent line to them, said tape further extending around substantially the entire surface of said guide member to the side surface thereof opposite said opposite side surface and then to the other side surface of another portion of said idler roller so that the portion of said tape extending between these latter surfaces becomes a common inscribed tangent line to them, the range of said magnetic tape being in contact with the guide member being regulated by said predetermined distance, and means to drive said tape over said surfaces of said guide member and said idler roller.

2. A device for magnetically recording and reproducing a wide-band signal comprising a magnetic tape, a tape guide member, a rotary head disposed within said tape guide member and including a magnetic transducer adapted to successively sweep diagonally across said tape, an elongated capstan disposed at a predetermined distance from said guide member, the longitudinal axis of said capstan extending at an angle with respect to the longitudinal axis of said tape guide member, said capstan having a length of at least as great as twice the width of said tape, said tape extending from one side surface of one portion of said capstan to the opposite side surface of said guide member so that the portion of said tape extending between said surfaces becomes a common inscribed tangent line to them, said tape further extending around substantially the entire surface of said guide member to the side surface thereof opposite said opposite side surface and then to the other side surface of another portion of said capstan so that the portion of said tape extending between these latter surfaces becomes a common inscribed tangent line to them, the range of said magnetic tape being in contact with the guide member being regulated by said predetermined distance, and a pair of pinch rollers provided at both sides of said capstan, said tape extending between said pinch rollers and said capstan and being driven by same.

3. A device for magnetically recording and reproducing a wide-band signal comprising a magnetic tape, a rotary head including a magnetic transducer, said magnetic transducer being adapted to successively sweep diagonally across said magnetic tape, a tape guide member having said rotary head disposed therein, a first idler roller having an axis making a predetermined angle with the axis of said tape guide member and adapted to guide said magnetic tape towards a starting portion of the sweep by said magnetic transducer on said magnetic tape, a second idler roller having an axis making a predetermined angle with the axis of said tape guide member and adapted to guide said magnetic tape away from a terminating portion of the sweep by said magnetic transducer on said magnetic tape, said magnetic tape being made to cross in a space between said two idler rollers and said tape guide member, and a tape guide groove formed on the side face of said tape guide member in eccentric relation with respect to said tape guide member, said two idler rollers being disposed adjacent a portion where the side face of said tape guide member merges with the face of said tape guide groove.

4. A device for magnetically recording and reproducing a wide-band signal comprising a magnetic tape, a rotary head including a magnetic transducer, said magnetic transducer being adapted to successfully sweep diagonally across said magnetic tape, a tape guide member having said rotary head disposed therein, a capstan having an axis making a predetermined angle with the axis of said tape guide member and adapted to guide said magnetic tape towards a starting portion of the sweep by said magnetic transducer on said magnetic tape and to guide said magnetic tape away from a terminating portion of the sweep by said magnetic transducer on said magnetic tape, said magnetic tape being made to cross in a space between said capstan and said tape guide member, at least one pinch roller disposed in abutting relation with said capstan with said magnetic tape interposed therebetween, means for driving said magnetic tape by said capstan and said pinch roller, and a tape guide groove formed on the side face of said tape guide member in eccentric relation with respect to said tape guide member, said capstan and said pinch roller being disposed adjacent a portion where the side face of said tape guide member merges with the face of said tape guide groove.

References Cited

UNITED STATES PATENTS

| | | | |
|---|---|---|---|
| 2,661,397 | 12/1953 | Berens et al. | 179—100.2 |
| 2,773,120 | 12/1956 | Masterson | 179—100.2 |
| 3,042,756 | 7/1962 | Buslik | 179—100.2 |
| 3,107,280 | 10/1963 | Suetsugu | 179—100.2 |
| 3,219,246 | 11/1965 | Kihara | 226—181 |

BERNARD KONICK, *Primary Examiner.*

L. G. KURLAND, *Assistant Examiner.*